US008754155B2

(12) United States Patent
Benbakoura et al.

(10) Patent No.: US 8,754,155 B2
(45) Date of Patent: Jun. 17, 2014

(54) DELIVERY SYSTEM FOR RELEASING SILICONE INGREDIENTS

(75) Inventors: Rahma Benbakoura, Colfontaine (BE); Serge Creutz, Liege (BE); Sophie Stassen, Brussels (BE)

(73) Assignee: Dow Corning Corporation, Midland, MI (US)

( * ) Notice: Subject to any disclaimer, the term of this patent is extended or adjusted under 35 U.S.C. 154(b) by 639 days.

(21) Appl. No.: 12/065,942

(22) PCT Filed: Sep. 1, 2006

(86) PCT No.: PCT/EP2006/065921
§ 371 (c)(1),
(2), (4) Date: Aug. 4, 2008

(87) PCT Pub. No.: WO2007/028773
PCT Pub. Date: Mar. 15, 2007

(65) Prior Publication Data
US 2009/0118399 A1  May 7, 2009

(30) Foreign Application Priority Data
Sep. 6, 2005 (GB) .................................. 0518059.1

(51) Int. Cl.
| *C11D 3/37* | (2006.01) |
| *C08L 33/02* | (2006.01) |
| *C08L 33/04* | (2006.01) |
| *C08L 33/20* | (2006.01) |
| *C08L 33/22* | (2006.01) |
| *C08L 33/24* | (2006.01) |
| *C08L 33/26* | (2006.01) |
| *C08K 5/17* | (2006.01) |

(52) U.S. Cl.
CPC *C11D 3/37* (2013.01); *C11D 3/373* (2013.01); *C11D 3/3761* (2013.01); *C11D 3/3742* (2013.01); *C08L 33/02* (2013.01); *C08L 33/04* (2013.01); *C08L 33/20* (2013.01); *C08L 33/22* (2013.01); *C08L 33/24* (2013.01); *C08L 33/26* (2013.01); *C08K 5/17* (2013.01)
USPC .......... 524/188; 524/262; 524/265; 524/502; 524/505; 524/506; 524/537

(58) Field of Classification Search
CPC .......... C11D 3/001; C11D 3/07; C11D 3/075; C11D 3/08; C11D 3/10; C11D 3/37; C11D 3/373; C11D 3/3761; C11D 3/3742; C08L 33/02; C08L 33/04; C08L 33/20; C08L 33/22; C08L 33/24; C08L 33/26; C08K 5/17; C08K 5/20; C08K 5/5419
USPC .......... 510/475, 476, 533; 524/502, 505, 506, 524/537, 188, 262, 265
See application file for complete search history.

(56) References Cited

U.S. PATENT DOCUMENTS

| 4,409,267 | A | * | 10/1983 | Ichinohe et al. ............... 427/387 |
| 4,537,677 | A | | 8/1985 | Keil |
| 4,591,652 | A | | 5/1986 | DePasquale et al. |
| 4,617,340 | A | * | 10/1986 | Tanaka et al. .................. 524/588 |
| 4,620,878 | A | * | 11/1986 | Gee .................................. 516/55 |
| 4,631,273 | A | | 12/1986 | Blehm et al. |
| 4,639,498 | A | | 1/1987 | Ritter |
| 4,846,982 | A | * | 7/1989 | Madore et al. ................. 510/330 |
| 4,866,152 | A | | 9/1989 | Lo |
| 4,978,471 | A | | 12/1990 | Starch |
| 5,091,105 | A | * | 2/1992 | Madore et al. ................. 510/328 |
| 5,393,381 | A | | 2/1995 | Hund et al. |
| 5,454,979 | A | | 10/1995 | Kobayashi et al. |
| 5,486,306 | A | | 1/1996 | L'Hostis et al. |
| 5,674,938 | A | | 10/1997 | Rautschek et al. |
| 5,831,080 | A | | 11/1998 | Sejpka et al. |
| 5,858,939 | A | | 1/1999 | Tsaur |
| 5,861,368 | A | | 1/1999 | Kolaitis et al. |
| 5,895,794 | A | | 4/1999 | Berg et al. |
| 6,013,682 | A | | 1/2000 | Dalle et al. |
| 6,136,215 | A | | 10/2000 | Evans et al. |
| 6,150,488 | A | | 11/2000 | Martin |

(Continued)

FOREIGN PATENT DOCUMENTS

| CN | 1404816 A | 3/2003 |
| EP | 0094250 A1 | 11/1983 |

(Continued)

OTHER PUBLICATIONS

Morrison, R.T., Boyd, R.N. "Organic Chemistry." 3rd ed. Boston: Allyn and Bacon Inc., 1973.*
English language abstract for WO2004024799, extracted from espacenet.com database, dated Nov. 10, 2008.
PCT International Search Report for PCT/EP2006/065921, dated Dec. 4, 2006, 3 pages.
English language abstract not available for JP 2001-518101; however, see English equivalent US 5,858,939. Orginal Document extracted from the espacenet.com database on Apr. 18, 2013, 39 pages.
English language abstract and machine-assisted English translation for JP 2006-257016 extracted from the PAJ database on Apr. 18, 2013, 32 pages.
English language abstract not available for CN 1404816. However, see English language equivalent US 2003/0108503. 48 pages.

* cited by examiner

*Primary Examiner* — Peter D Mulcahy
(74) *Attorney, Agent, or Firm* — Howard & Howard Attorneys PLLC

(57) ABSTRACT

A solid composition for releasing active silicone ingredients contains a cationic polymer, an active silicone ingredient and optionally a thickener and a carrier. The cationic polymer is preferably a homopolymer or a copolymer. The cationic polymer has higher water solubility at neutral pH than at a basic pH of 9-11. Granular encapsulated compositions can be prepared by using the solid silicone-releasing composition as a component in a laundry detergent powder, tablet or bar. This is particularly of interest for the delivery of silicone ingredients in the rinse cycle of a laundry operation.

12 Claims, No Drawings

(56) References Cited

U.S. PATENT DOCUMENTS

| | | |
|---|---|---|
| 6,171,515 B1 | 1/2001 | Evans et al. |
| 6,248,855 B1 | 6/2001 | Dalle et al. |
| 6,255,429 B1 * | 7/2001 | Griffin et al. ............ 528/25 |
| 6,294,516 B1 | 9/2001 | Jacques et al. |
| 6,316,541 B1 | 11/2001 | Gee |
| 6,362,159 B1 | 3/2002 | Aquadisch et al. |
| 6,395,790 B1 | 5/2002 | Creutz et al. |
| 6,482,969 B1 | 11/2002 | Helmrick et al. |
| 6,517,933 B1 | 2/2003 | Soane et al. |
| 6,521,586 B1 | 2/2003 | Hoogland et al. |
| 6,521,587 B1 | 2/2003 | L'Hostis et al. |
| 6,579,417 B1 | 6/2003 | Hund et al. |
| 6,878,773 B2 | 4/2005 | Marteaux et al. |
| 2003/0108503 A1 | 6/2003 | Maubru et al. |
| 2004/0040683 A1 | 3/2004 | Hund et al. |
| 2004/0121938 A1 * | 6/2004 | Blokzijl et al. ............ 510/511 |
| 2004/0152618 A1 * | 8/2004 | Mistry et al. ............ 510/475 |
| 2004/0166165 A1 * | 8/2004 | Mistry et al. ............ 424/490 |
| 2004/0254091 A1 | 12/2004 | Crass et al. |
| 2005/0250904 A1 | 11/2005 | Okawa et al. |

FOREIGN PATENT DOCUMENTS

| | | |
|---|---|---|
| EP | 0217501 A2 | 4/1987 |
| EP | 0299575 A1 | 1/1989 |
| EP | 0578423 A2 | 1/1994 |
| EP | 0540557 B1 | 10/1996 |
| EP | 0874017 A2 | 10/1998 |
| EP | 0995771 A2 | 4/2000 |
| EP | 1075864 A2 | 2/2001 |
| EP | 1479755 A1 * | 11/2004 |
| GB | 1041870 | 9/1966 |
| JP | 2001-518101 A | 10/2001 |
| JP | 2006-257016 A | 9/2006 |
| WO | WO 9201773 A1 | 2/1992 |
| WO | WO 9827189 A1 | 6/1998 |
| WO | WO 00/46335 A1 | 8/2000 |
| WO | WO 00/56849 A1 | 9/2000 |
| WO | WO 00/71240 A1 | 11/2000 |
| WO | WO 00/71658 A1 | 11/2000 |
| WO | WO 02102951 A1 | 12/2002 |
| WO | WO 03050144 A1 | 6/2003 |
| WO | WO 2004014326 A1 | 2/2004 |
| WO | WO 2004024799 A1 | 3/2004 |
| WO | WO 2004069899 A1 | 8/2004 |
| WO | WO 2005016998 A2 | 2/2005 |

DELIVERY SYSTEM FOR RELEASING SILICONE INGREDIENTS

RELATED APPLICATIONS

This application claims priority to and all the advantages of International Patent Application No. PCT/EP2006/065921, filed on Sep. 1, 2006, which claims priority to Great Britain Patent Application No. GB 0518059.1, filed on Sep. 6, 2005.

This invention is directed to a solid delivery system that is based on pH sensitive polymers, and to the release of silicone ingredients preferably in response to or triggered as a result of a change in pH during the wash cycle and the rinse cycle of a laundering process, which may take place in a washing machine, during manual washing or in other appropriate situations. Although the emphasis is on release in response to a change in pH, in some instances, such as when the polymers are temperature sensitive, the release can be triggered in response to temperature instead.

Garments washed with laundry detergents typically have a harsh touch and are as a result uncomfortable and unpleasant to wear. For that reason, it is common for consumers to use a fabric softener that has to be added separately in the washing machine during or within the programmed rinse cycle phase. Consumers are most concerned with convenience, and therefore there exists a market need for consumer goods able to deliver detergency and softness as a single finished product.

Some suggestions for making detergent formulations which include softening components have been proposed in the literature. EP 299575 for example provides a detergent composition comprising 5-40 weight % of an organic surfactant and, as a fabric softening ingredient, 1-30% of a smectite type clay containing a softness enhancing amount. of a polymeric clay-flocculating agent. The clay particles are more efficiently deposited onto fabrics during the laundry process from the detergent composition, regardless of the builder system used. In U.S. Pat. No. 6,294,516 a unit dose wash cycle fabric softener composition is provided which comprises a compacted granular fabric softener composition or an encapsulated liquid and/or granular fabric softener composition, comprising a montmorillonite-containing clay in combination with an organic fatty softening material. The unit dose fabric softener in the form of a tablet softens and conditions fabric in the wash cycle without impairing detergency or compromising the cleaning benefits provided by the detergent compositions. These disclosures deal with approaches where the softening action is produced in the wash cycle of the laundry process.

EP 1479755 discloses a pH sensitive film or coating composition comprising an amino-acetylated polysaccharide having a certain degree of acetylation. Also disclosed is a cleaning composition, for use in an automatic laundry or dishwashing machine comprising at least two functional parts, the primary one releasing a primary composition into a main wash cycle of the machine, and the secondary one releasing a secondary composition into a rinse cycle of the machine. The cleaning composition further comprises at least one release-controlling agent that prevents release of the secondary composition into the main wash liquor, which comprises an amino-acetylated polysaccharide having a certain degree of acetylation. The release-controlling agent provides beneficial care properties such as improved fabric softness. This invention is used in a multi-component tablet form where the secondary composition is located as a separately formed component in a depression in the tablet formed from the primary composition.

A delivery system is needed which does not require multicomponent tablets and which is capable of releasing a silicone based active material, such as a silicone softener at a stage of the wash cycle when the surfactants are not effective. Ideally, this delivery system should release the softener during the rinse cycle of the washing machine.

Although an important main need addressed by this invention is the provision of silicone active ingredients which provide softness, there is also a need to be able to provide other silicon-based materials effectively. It has been found that this is possible by the present invention by delivering them to the washing process as a result of the pH trigger. Such other silicon-based materials include in particular silicone foam control agents. The value of having foam control in the rinse cycle or rinse stage of a washing process is known and enables improved rinsing due to the absence or reduction of foam in the laundered textile materials or garments.

In WO 9827189, there is disclosed a mildly acidic laundry detergent composition for improved protection of fine fabrics and enhanced removal of foam. The composition is provided with a pH sensitive foam control agent comprising a fatty acid. The composition is stated as being capable of generating a wash water pH of 5.5-6.9 when added to wash water at a concentration to provide cleaning performance in the wash bath. The foam control agent, based on fatty acid, remains in acid form at the pH of the wash water to be inoperative to suppress foam during washing and upon rinsing laundry with tap water of pH about 7.5-8.5 at least a portion of the fatty acid is converted to soap which functions to suppress foam during rinsing. It is known that soaps are not always effective foam control agents, and there is a benefit in providing foam control in the rinse cycle when using silicone based foam control agents.

An alternative proposal is found in U.S. Pat. No. 4,978,471, which discloses a laundry detergent comprising a surfactant, builder and a foam control agent consisting of a dispersible silicone antifoam agent comprising a non-aqueous emulsion of primary and secondary antifoam agents in which (A) the primary antifoam agent is a mixture of (a) a polyorganosiloxane, (b) a resinous siloxane or a silicone resin-producing silicon-based compound, (c) a finely divided filler and (d) a catalyst to promote reaction of components (a), (b) and (c) to form silanolates; and (B) the secondary antifoam agent is a blend of (i) polydimethylsiloxane substituted with polar groups and (ii) a polydimethylsiloxane fluid, component (i) providing more effective reduction of foaming in the laundry rinse cycle, (iii) at least one nonionic silicone surfactant, (iv) a first organic dispersing agent and (v) a second dispersing agent of a nonionic di-functional block copolymer terminating in primary OH groups. There is however no indication of how to protect the secondary antifoam agent to ensure it transfers completely to the rinse cycle and is released there. The exemplified tests are based on using a separate spinner and transferring laundry to and from the laundry drum. A more robust and reliable system is still needed.

The need is further driven by the fact that besides softness or foam control, there is interest in delivering certain actives more efficiently, i.e., such as optical brighteners, perfumes, and silicones that contribute benefits other than softness. These can be delivered in addition to or as the silicone materials targeted for delivery of softness or other benefits under the instant invention. When delivered more efficiently, the level of such actives in a laundry detergent can be reduced, leading to the beneficial result of a significant cost savings for detergent manufacturers.

Surfactants in most laundry detergent are very effective for cleaning garments, but they generally prohibit or inhibit the deposition of active ingredients such as silicones on the garments. This can be overcome by using a delivery system that releases the active ingredient when the surfactants are ineffective, for example during the rinse phase of the washing cycle. The release is preferably triggered as a function of pH. Thus, in comparing the conditions existing during the wash and the rinse phases of a garment cleaning cycle of a washing machine, the pH during the wash phase generally increases to 9-10, the temperature increases to about 40° C. or more, and the ionic strength increases as well. During the rinse phase, the pH decreases to about 7-8, the temperature drops to room temperature, and the ionic strength tends to drop.

Among these parameters, the pH is the most versatile since it depends mainly on the laundry detergent composition, although the temperature can also be relied upon so as to provide a dual triggering mechanism. Ionic strength is a more difficult criterion to target. Therefore, a polymer that is poorly soluble in an aqueous medium at a high pH and much more soluble at about a neutral pH is required. Most polymers used for laundry have in fact an opposite behaviour, since they are mainly based on acrylic acid which has an improved solubility at higher pH.

It has surprisingly been found that cationic polymers such as poly(meth)acrylate polymers can be used effectively as a protective coating for the active silicone ingredient in the preparation of solid, preferably granular compositions intended for delivery of the active silicone ingredients to textile materials via the washing process Accordingly, the invention is directed to a solid silicone-releasing composition containing a cationic polymer that is cationic at pH of 7 and an active silicone ingredient, said cationic polymer and active silicone ingredient being mixed with each other prior to or during the formation of the solid composition. Preferably the solid silicone-releasing composition also comprises a thickener and a carrier. The term solid has been used to distinguish from liquid, and may be in any solid form, such as compact, paste-like, granular or other. Flowable granular material is specifically included in the term solid.

The invention is also directed to a solid silicone-releasing composition which is a granular encapsulated composition that consists of the solid silicone-releasing composition and to a laundry detergent powder containing as one of its ingredients the solid silicone-releasing composition. The invention is further directed to a method of washing and/or treating, for example softening, garments in a washing process, for example in a washing machine, by adding to the washing process the solid silicone-releasing composition according to the first aspect of the invention, possibly in conjunction with a laundry detergent powder, or by adding a laundry detergent powder containing the solid silicone-releasing composition according to the first aspect of the invention, such that the composition is first in contact with a basic pH during the wash cycle and then a neutral pH during the rinse cycle.

While it is preferred herein to use the solid silicone-releasing composition in a laundering application using a solid, e.g. granulated detergent powder, it can be used in other applications including, but not preferred, in conjunction with liquid detergents, in which case it would be added at the stage of starting a wash cycle, or still other, more preferred, applications such as automatic dish washing, hand soap bars, and general washing and/or cleaning applications which are suited to the use of solid particles. These and other features of the invention will become apparent from a consideration of the detailed description.

The solid silicone-releasing composition of the present invention generally comprises a cationic polymer, an active silicone ingredient and preferably a thickener and a carrier. The solid silicone-releasing composition may be prepared in a number of ways, provided the cationic polymer and the active silicone ingredient are mixed together, but it is preferred that they are prepared from a slurry, solution, emulsion or suspension, which is made with the use of an aqueous medium, such as water. If made in this way, the composition may be sprayed and dried or may be spray-dried to form a granular encapsulated composition containing the active silicone ingredient that can be released during one of the cycles of a washing machine. The drying can be done such that the granular encapsulated composition containing the active silicone ingredient is formed separately for post-mixing with a granulated laundry powder, or alternatively it can be dried together with other ingredients, such as detergent powder ingredients, to form a granular composition comprising the encapsulated active silicone ingredient and the other ingredients of a powder detergent composition.

The cationic polymer functions as a protective agent, e.g. coating for the active silicone ingredient such that its release is delayed or postponed till the correct conditions of pH or temperature are in place. In addition, the cationic nature of the cationic polymer reduces the level of residues, compared to what is typically left upon using nonionic type polymers. The carrier functions, when used, as a base upon which the protected active silicone ingredient is held in the encapsulated or coated form, but the invention also includes granular material made without carrier. The thickener enhances the protection of the active silicone ingredient through the wash cycle at higher pH, and is believed to improve the release and possibly deposition of the active silicone ingredient in a more neutral pH environment.

The cationic polymer is a homopolymer or a copolymer having a higher water solubility at neutral pH of 7 than at a basic pH of 9-11. The cationic polymer most preferably is a poly(meth)acrylate polymer. The cationic polymer is a homopolymer or copolymer prepared from monoethylenically unsaturated monomers, i.e., allylic and vinyl monomers. In particular, the cationic polymer is a homopolymer or copolymer prepared from acrylic or methacrylic monomers. Some examples of monomers that can be used to prepare the cationic homopolymer or copolymer include dialkylaminoalkyl acrylates, dialkylaminoalkyl methacrylates, dialkylaminoalkyl acrylamides, dialkylaminoalkylalkyl acrylamides, dialkylaminoalkyl methacrylamides, dialkylaminoalkylalkyl methacrylamides, in which the alkyl groups are alkyl groups containing 1-4 carbon atoms, vinylpyridine, vinylimidazole; wherein the monomers are partially quaternised, fully quaternised, or salified, by an acid, a quaternising agent, benzyl chloride, methyl chloride, an alkyl chloride, an aryl chlorides, or dimethylsulfate. As used herein, salified refers to the salt formed by the acid-base reaction between the amino and an acid.

Some examples of more specific monomers that can be used to prepare the cationic homopolymer or copolymer include dimethylaminoethyl acrylate, dimethylaminoethyl methacrylate, dimethylaminoethyl fumarate, tert-butylaminoethyl methacrylate, diethylaminoethyl methacrylate, diethylaminoethyl acrylate, tert-butylaminopropyl methacrylate, diisopropylaminoethyl methacrylate, partially or fully quaternised or salified by an acid, a quaternising agent, diallyldimethylammonium chloride, acrylamidopropyl trimethyl ammonium chloride, methacrylamidopropyl trimethyl ammonium chloride, acryloyl oxyhydroxypropyl trimethyl ammonium chloride, and methacryloyl oxyhydroxypropyl trimethyl ammonium chloride.

If desired, the cationic polymer can be prepared by additional monomers such as acrylamide, methacrylamide, alkyl acrylamides, alkylalkyl acrylamides, alkyl methacrylamides, alkylalkyl methacrylamides, alkyl acrylates, alkyl methacrylates, in which the alkyl groups contain 1-12 carbon atoms, N-vinyl methyl acetamide, N-vinylformamide, N-isopropyl methacrylamide, N-isopropyl acrylamide, N-ethyl acrylamide, N-ethyl methacrylamide, N-methyl acrylamide, N-hexyl acrylamide, N,N-dimethyl acrylamide, N,N-dipropyl acrylamide, N-tert-butyl acrylamide, octylacrylamide, N-methylol acrylamide, 2-ethoxyethylvinyl ether, 2-methoxyethylvinyl ether, methyltri(ethylene glycol)vinyl ether, dihydroxypropyl methacrylate, dihydroxypropyl acrylate, N-hydroxyalkyl acrylamide, N-hydroxyalkyl methacrylamide, N-hydroxyethyl acrylamide, N-hydroxyethyl methacrylamide, N,N-dihydroxyethyl acrylamide, N,N-dihydroxyethyl methacrylamide, hydroxyethyl acrylate, hydroxyethyl methacrylate, hydroxypropyl acrylate, hydroxypropyl methacrylate, methylvinyl ether, ethylvinyl ether, acrylates of poly(ethylene glycol), methacrylates of poly(ethylene glycol), acrylates of ethoxylated fatty alcohols, methacrylates of ethoxylated fatty alcohols, acrylates of poly(ethylene glycol)-poly(propylene glycol) copolymers, methacrylate of poly(ethylene glycol)-poly(propylene glycol) copolymers, acrylates of poly(propylene glycol), methacrylates of poly(propylene glycol), morpholino ethyl acrylate, morpholino ethyl methacrylate, vinyl acetate, vinylcaprolactam, vinylpyrrolidone, methyl methacrylate, styrene, and acrylonitrile.

The cationic polymer can be a linear polymer, a branched polymer, or a partially cross-linked polymer. The cationic polymer can be branched or partially cross-linked by branching agents that are diethylenically unsaturated monomers. For example, the branching agents that can be used include diacrylate esters and polyethylenically unsaturated monomers such as diacrylates of polyethylene glycol and methylene bisacrylamide.

The cationic polymer is preferably a poly(meth)acrylate polymer. Poly(meth)acrylate polymers and methods of making them are known in the art, and reference may be made, for example, to U.S. Pat. No. 5,393,381 (Feb. 28, 1995), U.S. Pat. No. 6,579,417 (Jun. 17, 2003), and US Published Application 2004/0040683 (Mar. 4, 2004), all of which are assigned to SNF S.A., Andrezieux Cedex, France. Such polymers and methods of making the polymer are described in the *Kirk-Othmer Encyclopedia of Chemical Technology*, Fourth Edition, Volume 1, Pages 266-287, John Wiley & Sons, (1981).

Generally, these poly(meth)acrylate polymers consist of homopolymers and copolymers made from monomers such as acrylamide, methacrylamide, N-vinyl methyl acetamide, N-vinylformamide, vinyl acetate, vinylpyrrolidone, and methyl methacrylate; and unsaturated ethylenic monomers such as dimethylaminoethyl acrylate, dimethylaminoethyl methacrylate, dimethyldiallyl ammonium chloride, acrylamidopropyltrimethyl ammonium chloride, and methylacrylamidopropyl trimethyl ammonium chloride. A most preferred poly(meth)acrylate polymer is poly(2-(dimethylamino)ethyl methacrylate).

For purposes of this invention, the cationic polymer should have a higher water solubility at neutral pH than at basic pH, such that upon application when the solid silicone-releasing composition is first in contact with a basic pH, and then a neutral pH, its dissolution will be delayed till the contact at neutral pH as used herein means a pH between 9 and 11. As noted, preferably it comprises an amino (meth)acrylate or (meth)acrylamide polymer or copolymer. The cationic polymer may contain other co-monomers to tune the water solubility, such as ethoxylated (meth)acrylates or ethoxylated (meth)acrylamides. Most preferably, one co-monomer should be as water soluble as 2-(dimethylamino)ethyl methacrylate, and even more preferably, more water soluble at neutral pH. While not wishing to be bound by the theory, it is believed that the polymers start protonating upon finding themselves in a less alkaline environment having a lower pH value, which increases their compatibility with water and hence improves the water solubility and the ability to release the active silicone ingredient. However other aspects will also contribute to the water solubility at neutral pH, such as polymer structure, presence of hydrophilic substituents on the polymer and the like. A person skilled in the art would be able to select suitable materials with reasonable assurance that they are worth trying out, based on the above clarification and information.

The active silicone ingredient can be selected from a variety of silicone compositions and emulsions containing the silicone compositions. As indicated above, the preferred active silicone ingredient is one which has the ability to provide softening to textiles or garments and these include materials described under categories (i), (iii), (iv), (vi), (vii), (ix) or (xi) in paragraph 0026 below. However active silicone ingredients with other effects are also included in the scope of this invention, and include for example silicone based foam control agents, silicone based optical brighteners and the like, some of which are exemplified below.

Some examples of the silicone compositions and emulsions containing the silicone compositions that can be used as the silicone active ingredient include (i) linear, branched, cyclic, and cross-linked polysiloxanes and emulsions thereof. Such materials have been described for example in U.S. Pat. No. 4,620,878, U.S. Pat. No. 5,895,794, U.S. Pat. No. 6,013,682, U.S. Pat. No. 6,316,541, U.S. Pat. No. 6,395,790, U.S. Pat. No. 6,878,773 and EP 874,017; (ii) silicone waxes and emulsions thereof as described for example in U.S. Pat. No. 6,362,159, (iii) aminofunctional silicones and emulsions thereof, as described for example in U.S. Pat. No. 6,171,515, U.S. Pat. No. 6,248,855, U.S. Pat. No. 6,255,429, EP 540,557 and WO 2004/069899; (iv) amidofunctional silicones and emulsions thereof, as described for example in U.S. Pat. No. 6,136,215; (v) aryl substituted silicones, alkyl substituted silicones, and emulsions thereof, as described for example in GB 1,041,870 (Sep. 7, 1966); (vi) silicone glycols and emulsions thereof, for example as described in EP 995,771, and in *Silicone Suffactants*, Surfactant Science Series, Volume 86, Randal M. Hill, Marcel Dekker, Inc., Pages 49-64, (1999); (vii) silicone gums, silicone gum blends, and emulsions thereof, such as described in WO 2005/016998; (viii) silicone resins and emulsions thereof, i.e. WO 2005/016998 (Feb. 24, 2005); (ix) sugar silicones and emulsions thereof, as described for example in U.S. Pat. No. 4,591,652, U.S. Pat. No. 5,831,080, U.S. Pat. No. 6,517,933, WO 2003/50144 and WO 2004/24799, (x) fluorosilicone fluids and emulsions thereof as described for example in U.S. Pat. No. 4,537,677 and U.S. Pat. No. 5,454,979; (xi) cationic silanes, cationic silicones, and emulsions thereof, i.e., U.S. Pat. No. 4,631,273 (Dec. 23, 1986) and U.S. Pat. No. 6,482,969 (Nov. 19, 2002): (xii) fabric whitening agents, i.e., optical brighteners, for example, as described in U.S. Pat. No. 4,866,152 that are fluorescent organosilicon compounds derived from the reaction of an aminoalkyl functional organosilicon compound with a fluorescent functional organosulfonic acid; and (xiii) silicone-based foam control agents such as antifoams and emulsions thereof, as described for example in U.S. Pat. No. 4,639,498, U.S. Pat. No. 5,486,306, U.S. Pat. No. 6,521,586 and U.S. Pat. No. 6,521,587. Mixtures and/or blends of compositions and/or emulsions of (i)-(xiii) can also be employed.

The most preferred active silicone ingredients are those which provide softness to textile fabrics and are preferably selected form the substantially linear polydiorganosiloxane materials, whether end-blocked with trialkylsilyl units, dialkylarylsilyl units, dialkylsilanol units or the like, polydiorganosiloxanes substituted with amino functionality, polyorganosiloxanes substituted with amido functionality, polydiorganosiloxanes with polyoxyalkylene functionality and polydiorganosiloxanes with either amino or amido functionality and polyoxyalkylene functionality in the same polymer. Preferably the polyorganosiloxanes are polydihydrocarbylsiloxanes having siloxane units of the general formula $R_a SiO_{4-a/2}$ where R denotes a hydrocarbon group, preferably having from 1 to 12 carbon atoms, preferably an alkyl, aryl or alkenyl group, most preferably an alkyl group having from 1 to 6 carbon atoms, most preferably methyl and a is an integer with a value from 0 to 3, but with an average value for the polymer of from 1.6 to 2.4, preferably 1.9 to 2.2. These preferred polyorganosiloxanes are substantially linear materials with end-groups of the general formula $R@R_{a-1}SiO_{4-a/2}$ where R@ is a group R or hydroxyl.

The above described polyorganosiloxanes substituted with a functionality have additionally siloxane units of the general formula $R_b R'_c SiO_{4-b-c/2}$, where R is as defined above, R' is a functional group, selected from an amine containing substituent, an amido containing substituent and a polyoxyalkylene containing substituent, b is an integer with a value of from 0 to 2, c is an integer with a value of 1, 2 or 3, b+c having a value of from 1 to 3, preferably with an average of from 1.6 to 2.4, more preferably 1.9 to 2.2. R' groups with amine functionality are preferably selected from aminoalkyl groups. Suitable aminoalkyl groups have the formula $R^1$—$(NH-A')_q$-NH-A- wherein A and A' are each independently a linear or branched alkylene group having 1 to 6 carbon atoms and optionally containing an ether linkage; q=0 to 4; $R^1$ is hydrogen or an alkyl or hydroxyalkyl group having 1 to 4 carbon atoms. Examples of preferred aminoalkyl groups include —$(CH_2)_3NH_2$, —$(CH_2)_4NH_2$, —$(CH_2)_3NH(CH_2)_2NH_2$, —$CH_2CH(CH_3)CH_2NH(CH_2)_2NH_2$, —$(CH_2)_3NHCH_2CH_2NH(CH_2)_2NH_2$, —$CH_2CH(CH_3)CH_2NH(CH_2)_3NH_2$, —$(CH_2)_3NH(CH_2)_4NH_2$ and —$(CH_2)_3O(CH_2)_2NH_2$. Amido containing substituents R' are provided for example by the group =$NCO(CHR^1)_n OH$ linked to the silicon atom through a divalent linkage $R^2$. Preferably $R^1$ represents a hydrogen atom and n has the value 3, 4, 5 or 6. Preferred materials are those wherein $R^2$ represents a divalent hydrocarbon group or a group $R^3(NR^4R^3)s$ wherein $R^3$ represents a divalent hydrocarbon group, $R^4$ is represents a hydrogen atom, an alkyl group having 1 to 20 carbon atoms, an alkenyl group or an aryl group, or a group X, X represents the group $CO(CHR^5)_n OH$, wherein $R^5$ represents a hydrogen atom or an alkyl group and s has a value in the range 0 to 4, more preferably 1 or 2. Where the functionality is polyoxyalkylene, the substituent will have the general formula —$R^3(OC_2H_4)_t(OC_3H_6)_u$ where $R^3$ is as defined above, and t has a value of from 1 to 50, preferably 3 to 10 and u has a value of from 0 to 50, preferably 0 to 8.

Where the active silicone ingredients are chosen as foam control agents/antifoams, they generally comprise a polyorganosiloxane fluid and preferably also a hydrophobic particulate filler. The polysiloxane fluid may be a substantially linear polydiorganosiloxane or may be branched as described for example in EP-A-217501, U.S. Pat. No. 5,674,938 and U.S. Pat. No. 6,150,488. The organic groups in the polyorganosiloxane fluid generally comprise methyl groups and may additionally comprise a silicon-bonded substituent of the formula Y-Ph, wherein Y denotes a divalent aliphatic organic group bonded to silicon through a carbon atom and Ph denotes an aromatic group, examples of such fluids being described in EP-A-1075864, or a higher (C8+) alkyl group, examples of such fluids being described in EP-A-578423. A preferred hydrophobic filler is silica, made hydrophobic by treatment with a methyl substituted organo-silicon material such as polydimethylsiloxane, hexamethyldisilazane, hexamethyldisiloxane or an organosilicon resin comprising monovalent groups $(CH_3)_3SiO_{1/2}$, or with a fatty acid, preferably at a temperature of at least 80° C. Alternative hydrophobic fillers include titania, ground quartz, alumina, aluminosilicates, organic waxes, e.g. polyethylene wax or microcrystalline wax, and/or alkyl amides such as ethylenebisstearamide or methylenebisstearamide. The silicone antifoam preferably also contains a silicone resin, for example a MQ resin comprising groups of the formula $R^*_3SiO_{1/2}$ and $SiO_{4/2}$ groups, wherein $R^*$ denotes a monovalent hydrocarbon group. The silicone resin can be soluble, partially soluble or insoluble in the polysiloxane fluid.

Thickeners which are useful in the compositions of the present invention are materials which, when put into contact with an aqueous medium, increase the viscosity of said aqueous medium. These materials are known to the person skilled in the art and have been described in a number of publications. Suitable types of thickeners useful for the compositions according to the invention comprise one or more polymeric materials selected from polyacrylates and derivatives thereof, polysaccharides and derivatives thereof and polymer gums. Polyacrylate-type thickeners comprise in particular polyacrylate polymers and copolymers of acrylate and methacrylate. Examples of suitable polyacrylate type thickeners are those containing acrylate monomers, acrylamide monomers or mixtures thereof. These thickeners may be a carbomer polymer such as Carbopol 940. These preferred carbomers are Carbopol® 940, Carbopol 941, Carbopol 980, Carbopol 981, Carbopol Ultrez 10 and Carbopol ETD 2050 and mixtures thereof, all being sold by Noveon. Examples of polymeric gums which may be used as thickeners herein can be characterized as marine plant, terrestrial plant, microbial polysaccharides and polysaccharide derivatives. Examples of marine plant gums include agar, alginates, carrageenan and furcellaran. Examples of terrestrial plant gums include guar gum, gum Arabic, gum tragacenth, karaya gum, locust bean gum and pectin. Examples of microbial polysaccharides include dextran, gellan gum, rhamsan gum, welan gum and xanthan gum. Examples of polysaccharide derivatives include carboxymethyl cellulose, methyl hydroxypropyl cellulose, hydroxypropyl cellulose, hydroxyethyl cellulose, propylene glycol alginate and hydroxypropyl guar. Specifically useful thickeners include pectin, alginate, e.g. sodium alginate, arabinogalactan (gum Arabic), carrageenan, gellan gum, xanthan gum, guar gum, e.g. polyoxyethylene, guar gum, hydroxypropyl guar gum, pluronic materials, ethoxylated alcohols, such as laureth-4 or polyethylene glycol 400, cellulose derivatives exemplified by methylcellulose, methylhyd roxypropylcellu lose, hydroxypropylcellulose, polypropylhydroxyethylcellulose, starch, and starch derivatives exemplified by hydroxyethylamylose and starch amylose, locust bean gum and saccharides such as fructose and glucose, and derivatives of saccharides such as PEG-120 methyl glucose diolate. Suitable thickeners are likely to have a molecular weight in excess of 50,000 going up to several million.

Carriers for use in the compositions of the present invention, where used and some methods of encapsulating the active silicone ingredients are described for example in U.S.

Pat. No. 5,861,368, U.S. Pat. No. 6,521,587, and in European patent specification EP 0,094,250. Starch is a potential carrier for use in the present invention, but other carriers can also be employed such as zeolites, sulphates, carbonates, phosphates, polyphosphates, silicas, silicates, clays, cellulosic materials, citric acid, and aluminosilicates. The carrier, when used, is a particulate material which preferably interacts exothermically with the liquid which is sprayed during an agglomeration step. Preferably the carrier is soluble in water and has a positive heat of hydration and/or solution by water. Sodium carbonate, particularly anhydrous sodium carbonate, commonly known as light soda ash for the technical grade, is a preferred carrier for foam control agents; an alternative is sodium tripolyphosphate. The mean particle radius of the carrier is preferably at least 3 microns and most preferably at least 10 microns up to 250 microns, more preferably 25 to 100 microns. The weight ratio of carrier particles to the other ingredients in dry form (active silicone material plus cationic polymer, and other optional ingredients) is preferably in the range 1:1 to 50:1.

Other types of active ingredients can be included in the solid silicone-releasing compositions according to the invention in addition to the active silicone ingredients. For example, the composition may contain (i) organic or inorganic softening agents such as ester quats, tallow quats such as dimethyl hydrogenated tallow-2-ethylhexyl ammonium methyl sulfate sold under the trademark Arquad® HTL8, dimethyl dihydrogenated tallow ammonium chloride sold under the trademark Arquad 2HT, fatty acids, smectite clays including beidellite clays, hectorite clays, laponite clays, montmorillonite clays, nontonite clays, and saponite clays; (ii) organic fabric whitening and/or optical brightening agents such as stilbene derivatives, styryl derivatives of benzene and biphenyl, pyrazolines, bis(benzoxazol-2-yl) derivatives, coumarins, carbostyrils, and naphthalimides; (iii) soil and/or stain repellency agents such as polyethylene terephthalate/polyoxyethylene terephthalate PET/POET water-soluble polymers; (iv) anti-wrinkle treating agents such as methylol compounds of urea, alkoxymethylol compounds of urea, melamines, and carbamates and (v) foam control agents not based on silicone antifoams, and emulsions thereof.

Another type of active ingredient that can be included in the composition is a perfume. The perfume can be present at a level of from 0.1-15 percent by weight based on the weight of the composition. The perfume can be a fragrant odoriferous substance or a mixture of fragrant odoriferous substances including natural substances obtained by extraction of flowers, herbs, leaves, roots, barks, wood, blossoms or plants; artificial substances including mixtures of different natural oils or oil constituents; and synthetically produced substances. Some examples of perfume ingredients that are useful include hexyl cinnamic aldehyde; amyl cinnamic aldehyde; amyl salicylate; hexyl salicylate; terpineol; 3,7-dimethyl-cis-2,6-octadien-1-ol; 2,6-dimethyl-2-octanol; 2,6-dimethyl-7-octen-2-ol; 3,7-dimethyl-3-octanol; 3,7-dimethyl-trans-2,6-octadien-1-ol; 3,7-dimethyl-6-octen-1-ol; 3,7-dimethyl-1-octanol; 2-methyl-3-(para-tert-butylphenyl)-propionaldehyde; 4-(4-hydroxy-4-methylpentyl)-3-cyclohexene-1-carboxaldehyde; tricyclodecenyl propionate; tricyclodecenyl acetate; anisaldehyde; 2-methyl-2-(para-iso-propylphenyl)-propionaldehyde; ethyl-3-methyl-3-phenyl glycidate; 4-(para-hydroxyphenyl)-butan-2-one; 1-(2,6,6-trimethyl-2-cyclohexen-1-yl)-2-buten-1-one; para-methoxyacetophenone; para-methoxy-alpha-phenylpropene; methyl-2-n-hexyl-3-oxo-cyclopentane carboxylate; and undecalactone gamma.

Additional examples of perfume ingredients include orange oil; lemon oil; grapefruit oil; bergamot oil; clove oil; dodecalactone gamma; methyl-2-(2-pentyl-3-oxo-cyclopentyl) acetate; beta-naphthol methylether; methyl-beta-naphthylketone; coumarin; decylaldehyde; benzaldehyde; 4-tert-butylcyclohexyl acetate; alpha, alpha-dimethylphenethyl acetate; methylphenylcarbinyl acetate; Schiff's base of 4-(4-hydroxy-4-methylpentyl)-3-cyclohexene-1-carboxaldehyde and methyl anthranilate; cyclic ethyleneglycol diester of tridecandioic acid; 3,7-dimethyl-2,6-octadiene-1-nitrile; ionone gamma methyl; ionone alpha; ionone beta; petitgrain; methyl cedrylone; 7-acetyl-1,2,3,4,5,6,7,8-octahydro-1,1,6,7-tetramethyl-naphthalene; ionone methyl; methyl-1,6,10-trimethyl-2,5,9-cyclododecatrien-1-yl ketone; 7-acetyl-1,1,3,4,4,6-hexamethyl tetralin; 4-acetyl-6-tert-butyl-1,1-dimethyl indane; benzophenone; 6-acetyl-1,1,2,3,3,5-hexamethyl indane; 5-acetyl-3-isopropyl-1,1,2,6-tetramethyl indane; 1-dodecanal; 7-hydroxy-3,7-dimethyl octanal; 10-undecen-1-al; iso-hexenyl cyclohexyl carboxaldehyde; formyl tricyclodecan; cyclopentadecanolide; 16-hydroxy-9-hexadecenoic acid lactone; 1,3,4,6,7,8-hexahydro-4,6,6,7,8,8-hexamethylcyclopenta-gamma-2-benzopyrane; ambroxane; dodecahydro-3a,6,6,9a-tetramethylnaphtho-2, 1b furan; cedrol; 5-(2,2,3-trimethylcyclopent-3-enyl)-3-methylpentan-2-ol; 2-ethyl-4-(2,2,3-trimethyl-3-cyclopenten-1-yl)-2-buten-1-ol; caryophyllene alcohol; cedryl acetate; para-tert-butylcyclohexyl acetate; patchouli; olibanum resinoid; labdanum; vetivert; copaiba balsam; fir balsam; and condensation products of: hydroxycitronellal and methyl anthranilate; hydroxycitronellal and indol; phenyl acetaldehyde and indol; 4-(4-hydroxy-4-methyl pentyl)-3-cyclohexene-1-carboxaldehyde, and methyl anthranilate.

More examples of perfume ingredients are geraniol; geranyl acetate; linalool; linalyl acetate; tetrahydrolinalool; citronellol; citronellyl acetate; dihydromyrcenol; dihydromyrcenyl acetate; tetrahydromyrcenol; terpinyl acetate; nopol; nopyl acetate; 2-phenylethanol; 2-phenylethyl acetate; benzyl alcohol; benzyl acetate; benzyl salicylate; benzyl benzoate; styrallyl acetate; dimethylbenzylcarbinol; trichloromethylphenylcarbinyl methylphenylcarbinyl acetate; isononyl acetate; vetiveryl acetate; vetiverol; 2-methyl-3-(p-tert-butylphenyl)-propanal; 2-methyl-3-(p-isopropylphenyl)-propanal; 3-(p-tert-butylphenyl)-propanal; 4-(4-methyl-3-pentenyl)-3-cyclohexenecarbaldehyde; 4-acetoxy-3-pentyltetrahydropyran; methyl dihydrojasmonate; 2-n-heptylcyclopentanone; 3-methyl-2-pentyl-cyclopentanone; n-decanal; n-dodecanal; 9-decenol-1; phenoxyethyl isobutyrate; phenylacetaldehyde dimethylacetal; phenylacetaldehyde diethylacetal; geranonitrile; citronellonitrile; cedryl acetal; 3-isocamphylcyclohexanol; cedryl methylether; isolongifolanone; aubepine nitrile; aubepine; heliotropine; eugenol; vanillin; diphenyl oxide; hydroxycitronellal ionones; methyl ionones; isomethyl ionomes; irones; cis-3-hexenol and esters thereof; indane musk fragrances; tetralin musk fragrances; isochroman musk fragrances; macrocyclic ketones; macrolactone musk fragrances; and ethylene brassylate.

For some applications, it may be desired to adjust the water solubility of the cationic polymer by blending it with a binder. The binder when used may be mixed with the active silicone material and has a melting point above ambient temperature. The binder is preferably soluble in water to some extent. Examples of binders are polyoxyalkylene polymers such as polyethylene glycol (PEG), reaction products of $C_{10}$-$C_{20}$ alcohols and ethylene oxide.

The binder may consist of a solid water soluble polymeric material such as a water soluble polymer or water soluble copolymer. The binder can also be a compound such as acrylic acid, methacrylic acid, acrylamide, a cellulose derivative or salt thereof, carboxymethylchitin, polyvinylpyrrolidone, polyvinyl alcohol, ester gum, starch derivative, polysaccharide, polyethylene oxide, gelatin, collagen, carbohydrate, hyaluoronic acid, sodium alginate, gelatin gluten, a natural gum, or a mixture thereof. Some examples of water soluble polymeric materials include water soluble acrylic polymeric compounds including carboxyvinyl polymers such as polyacrylic acid, polymethacrylic acid, copolymers or partially cross-linked products thereof; water soluble salts such as ammonium salts and alkali metal salts, including sodium and potassium salts; polyacrylamide and copolymers, or partially crosslinked products of polyacrylamide and a carboxyvinyl polymer, having a molecular weight of 20,000 or more, preferably from 50,000-15,000,000; water soluble cellulose derivatives such as methyl cellulose, ethyl cellulose, hydroxymethyl cellulose, hydroxypropyl methyl cellulose, carboxymethyl cellulose, carboxymethylchitin, polyvinylpyrrolidone, polyvinyl alcohol, ester gum; water soluble derivatives of starch such as hydroxypropyl starch, carboxymethyl starch; and water soluble polyethylene oxides. Examples of natural polymeric materials that can be used include hyaluronic acid, sodium alginate, ether collagen, gelatin, gluten, gum arabic, mannan, dextran, tragacanth gum, amylopectin, xanthan gum, cholla gum, locust bean gum, casein, pectin, and fibrin glue. Additionally, copolymers of ethylene oxide and propylene oxide can be used. It is possible of course that the binder materials mentioned here fulfil at the same time a different role. For example, some carrier materials may also have properties required for the binder or the thickener.

The solid silicone-releasing composition typically is made from an aqueous mixture which contains 0.3 to 10 percent by weight of the cationic polymer based on the weight of the composition, but if no carrier is used, this is more typically from 10 to 30% by weight, 5 to 40 percent by weight of an aqueous medium based on the weight of the composition, 1 to 40 percent by weight of the active silicone ingredient, 0 to 4 percent by weight of the thickener and 0 to 80 percent by weight of the carrier based on the weight of the composition. When the process step of drying has been carried out, as is discussed below, the solid silicone-releasing composition will have typically 0.5 to 10, more preferably 1 percent by weight of the cationic polymer based on the weight of the composition, but if no carrier is used, this is more typically from 10 to 30% by weight, more preferably 10 to 20% 1 to 25 percent by weight of the active silicone ingredient, more preferably 5 to 20 percent, 0 to 2 percent by weight of the thickener, but where used more preferably 0.1 to 1.5 percent and 0 to 90 percent by weight of the carrier based on the weight of the composition, where used more preferably 50 to 90 percent.

During the process for making the solid silicone-releasing composition according to the invention, an aqueous medium is used to enable the drying, e.g. the spray drying, to form the solid silicone-releasing composition. Such aqueous medium is water and may be purified, such as distilled water, but such is not required for the invention. The process does require the cationic polymer and the active silicone ingredient to be mixed with each other prior to or during the formation of the solid composition. It is not good enough to merely have the two ingredients present if they have not been contacted with each other. In the event a detergent powder is made containing the solid silicone-releasing composition for example, it is not sufficient that both components are present in the powder detergent, for example where one were to be incorporated early and then the second one were to be added (sprayed on) to the powder detergent. The mixing may take place by bringing the ingredients together prior to spraying them or otherwise making them into a solid material. Alternatively, they may be sprayed together onto a carrier with the mixing taking place on the surface of the carrier.

Although carrier and thickener are described as being optional, it is particularly preferred to have both ingredients present in the solid silicone-releasing composition. Carriers will aid the formation of a granular composition, while thickeners are believed to improve the protection of the active silicone ingredient during the wash cycle, resulting in a greater availability thereof in the rinse cycle.

When it is desired to add the composition to the washing machine as a unit dose that can be used in combination with the detergent, a disintegrant may be included if needed to form the composition into a tablet. The composition can also be added to the washing machine as a powder that can be used in combination with detergent powders. The composition can also be used alone without the detergent, in which case it can be in the form of a tablet or a powder.

The solid silicone-releasing composition according to the invention may also be part of a powder detergent composition by being included during the manufacture of the powder detergent composition with the ingredients of the powder detergent composition, or by being mixed with such ingredients after the solid silicone-releasing composition and the powder detergent have been prepared separately. In either case, the solid silicone-releasing composition or the fully formulated powder detergent composition may include additional components which are often associated with powder detergent compositions. Such components include detergency builders, bleaches, enzymes and other components as described below.

The solid silicone-releasing composition or the powder detergent composition may contain one or more detergency builders. The total amount of detergency builder in the powder detergent composition typically ranges from 5-80 percent by weight based on the weight of the powder detergent composition. Some inorganic builders that may be present include sodium carbonate, crystalline and amorphous aluminosilicates such as zeolites, amorphous aluminosilicates, mixed crystalline/amorphous aluminosilicates and layered silicates. Inorganic phosphate builders can also be used such as sodium orthophosphate, pyrophosphate, and tripolyphosphate. Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di-, and trisuccinates, carboxymethyloxy succinates, carboxy methyloxymalonates, dipicolinates, hydroxyethyl iminodiacetates, alkyl- and alkenylmalonates and succinates; and sulphonated fatty acid salts.

The compositions according the invention, whether solid silicone-releasing compositions or powder detergent compositions, may contain a bleach such as an inorganic persalts or organic peroxy acid capable of yielding hydrogen peroxide in an aqueous solution. Some suitable peroxy bleach compounds include organic peroxides such as urea peroxide, and inorganic persalts such as the alkali metal perborates, percarbonates, perphosphates, persilicates, and persulphates. Preferred inorganic persalts are sodium perborate monohydrate and tetrahydrate, and sodium percarbonate. The peroxy bleach is generally present in an amount of from 0.1-35 percent by weight based on the weight of the wash composition.

The compositions according to the invention may also contain one or more enzyme(s). Some suitable enzymes include proteases, amylases, cellulases, oxidases, peroxidases, and lipases. They may be of any suitable origin such as vegetable, animal, bacterial, or yeast. Alkali metals such as sodium carbonate can also be included to increase detergency. Still other materials that may be present in the compositions according the invention include sodium silicate; anti-redeposition agents such as cellulosic polymers; inorganic salts such as sodium sulphate; lather control agents or lather boosters; dyes; foam controllers; fluorescing agents; and decoupling polymers.

The composition according to the invention, in particular the powder detergent composition, rather than the solid silicone-releasing composition on its own may also contain one or more cationic, anionic, zwitterionic and/or nonionic surfactants. The amount of surfactant(s) used in the composition is generally 0.1-70 percent by weight based on the total weight of the powder detergent composition. Most preferred are linear alkylbenzene sulphonate anionic surfactants having an average alkyl component of $C_8$-$C_{15}$. Other suitable branched anionic surfactants include secondary alkylsulphonates, secondary alcohol sulphates, and secondary alkyl carboxylates. Suitable further anionic surfactants include primary alkyl sulphates, particularly $C_8$-$C_{15}$ primary alkyl sulphates; alkyl ether sulphates, olefin sulphonates, alkyl xylene sulphonates, dialkyl sulphosuccinates, and fatty acid ester sulphonates. Some examples of nonionic surfactants that may be used include fatty acid ester ethoxylates, the primary and secondary alcohol ethoxylates, especially the $C_8$-$C_{20}$ aliphatic alcohols ethoxylated with an average of from 1-20 moles of ethylene oxide per mole of alcohol, and more especially the $C_{10}$-$C_{15}$ primary and secondary aliphatic alcohols ethoxylated with an average of from 1-10 moles of ethylene oxide per mole of alcohol. Non-ethoxylated nonionic surfactants include alkylpolyglycosides, glycerol monoethers, and polyhydroxyamides (glucamide).

In order to produce the solid silicon-releasing composition, typically, an aqueous solution of the cationic polymer is prepared, containing from 10 to 50% by weight of the polymer, preferably 20 to 30% by dissolving the polymer in water. For the preferred active silicone ingredients used for softening, the solution is then blended with an emulsion containing the active silicone ingredient at a neutral or low pH. Such emulsions are well known and have been described in the art, including some of those referred to above. The mixture is then sprayed into a chamber, preferably onto the carrier using standard spraying processes. The particles are preferably agitated in a high shear mixer through which the particles pass continuously. In one preferred process, the particles are agitated in a vertical, continuous high shear mixer in which an emulsion of the active material is sprayed onto the particles. One example of such a mixer is a Flexomix® mixer supplied by Hosokawa Schugi. When the sprayed composition is ready, it may undergo an additional drying or cooling phase. Where the thickener is also used in the preparation of the solid silicone-releasing composition it is preferred that the thickener is mixed with either the cationic polymer, or more preferably with the aqueous suspension or emulsion of the active silicone ingredient prior to the addition of the other essential ingredient.

Vertical, continuous high shear mixer may be used. Alternatively, horizontal high shear mixers may be used, in which an annular layer of the powder—liquid mixture is formed in the mixing chamber, with a residence time of a few seconds up to about 2 minutes. Examples of this family of machines are pin mixers (e.g. TAG series supplied by LB, RM-type machines from Rubberg-Mischtechnik), paddle mixers (e.g. CB series supplied by Lodige, Corimix® from Drais-Manheim, Conax® machines from Ruberg Mischtechnik). Other possible mixers which can be used in the process of the invention are ploughshare mixers, as sold for example by Lodige GmbH, twin counter-rotating paddle mixers, known as Forberg®-type mixers, intensive mixers including a high shear mixing arm within a rotating cylindrical vessel, such as "Typ R" machines sold by Eirich, Zig-Zag® mixers from Patterson-Kelley, and HEC® machines sold by Niro.

The residence time of the particles in the mixing chamber is generally at least 0.1 and preferably at least 0.5 seconds up to 10 or even 60 seconds, for example about 1 second. A low residence time and hence high throughput give great economic advantages, but if the residence time is less than 0.1 second this time may be too short for the liquid of the aqueous medium to evaporate and hence for the particles to solidify, which may be an issue especially when no carrier is being used. Higher residence times, and especially if the residence time is at least 0.5 second, is more preferred.

The composition can also be spray dried by blending the cationic polymer with an emulsion containing the active ingredient and drying it to obtain a solid material without the carrier. This is only possible if the mixture of ingredients at room temperature is capable of forming a solid. It is also possible that the emulsion could be initially granulated with a different binder, and that the cationic polymer be applied in a second step as a post-coating. Alternatively, the cationic polymer and the emulsion can be sprayed in parallel onto the carrier, in which case contact between the two components occurs only on the carrier. Extrusion is an alternative process in which all of the raw materials could be simply blended in an extruder. The carrier can in some instances function as a detergent powder by blending the cationic polymer and the emulsion, and then spraying them directly on the detergent powder before or during the drying step.

The solid silicone-releasing composition according to the invention, and of course also the granular encapsulated composition thereof, can be used independently, or it can be directly blended with a powder detergent composition or used in conjunction with a powder detergent composition or with a detergent tablet. The best performance has been achieved with cationic polymers in which the water solubility of species of the polymers was increased, either by protonating the nitrogen atom containing group with an acid, or copolymerizing it with a hydrophilic monomer. While the cationic polymers do not provide any significant softness benefit, their main function according to this invention resides in their ability to control the release of the active silicone ingredient.

While it is preferred herein to use the solid silicone-releasing compositions according to the invention in laundering applications as previously noted, the compositions have other uses including automatic dish-washing, hand soap bars, general cleaning and/or washing applications, such as hand washing garments.

Compositions herein can be used for delivering any benefits including perfume delivery, reduction of wrinkles, prevention of wrinkles, removal of wrinkles, fabric softening, fabric feel enhancement, garment shape retention, elasticity, ease of ironing, colour retention, anti-abrasion, anti-pilling, reduced drying time, water absorbency, gloss, lubrication, protection, friction modification, stain resistance, water repellency, abrasion resistance and the like through the release of the silicone or in addition to the release of the silicone.

Other variations may be made in compounds, compositions, and methods described herein without departing from the essential features of the invention. The embodiments of the invention specifically illustrated herein are exemplary only and not intended as limitations on their scope except as defined in the appended claims.

EXAMPLES

The following examples are set forth in order to illustrate the invention in more detail. The cationic polymer used in the examples is poly(2-(dimethylamino)ethyl methacrylate).

Example 1

Polymer Preparation

Poly(2-(dimethylamino)ethyl methacrylate) was prepared by free radical polymerization carried out in toluene, in the presence of a free radical initiator. Details of the procedure can be found in the *Journal of Coating Technology*, Volume 70, No. 883, Pages 41-46, S. Creutz and R. Jerome, entitled "Design of Polymeric Dispersants for Waterborne Coatings", August 1998. A brief summary of the polymer synthesis is as follows: 5.08 gram of Vazo® 64 (azobisiosobutyronitrile from DuPont) was solubilised in 242.16 gram of toluene, and placed in a feed flask. 250 gram of dimethylaminoethyl-methacrylate (DMAEMA) was placed in a separate feed flask. An additional 242.16 gram of toluene was charged into a one liter reactor and agitated with a Caframo® mixer at 300 rpm. After heating the reactor to 70° C., the contents of the two feed flasks were added to the reactor at a rate of 30 ml/hour. The reaction was allowed to continue for 24 hours at 70° C., and then the reactor was cooled to room temperature. The toluene was removed by stripping using a rotary evaporator.

Example 2

Granulation

An aqueous solution of poly(2-(dimethylamino)ethyl methacrylate) was prepared by using 9.29 gram of poly(2-(dimethylamino)ethyl methacrylate), 32.01 gram of demineralised water, and 10.70 gram of 37 weight percent hydrochloric acid. About 86 gram of a cationic silicone emulsion containing 60 percent by weight of polydimethylsiloxane polymer having a viscosity at 25° C. of 60,000 mm$^2$/sec, and 24.3 gram of demineralised water, were added to the aqueous solution. 122.5 gram of the combined solution was poured onto 200 gram of starch under shear using a standard food mixer. The resulting granule was dried at 50° C. over a period of about 20 minutes in a fluid bed, and then sieved, this yielding a granular encapsulated composition.

Example 3

Testing Protocol

An evaluation was carried out using a Miele® Model 934 front-loading washing machine. The washing conditions included a normal wash cycle at 40° C., a load of one kilogram (2.2 pounds) of four towels and five pillow cases, a spinning speed of 600 rpm, and machine-self addition of soft water. About 62 gram of a regular commercial grade laundry detergent was added to the machine. 40.21 gram of the granular encapsulated composition prepared in Example 2 was blended into the laundry detergent before it was added to the machine and then tested. As a comparison, towels were washed with the regular commercial grade laundry powder without the granulated silicone using 62 gram of the regular commercial grade laundry detergent on its own. Both sets of towels were line dried overnight. 16 panellists were asked to assess the softness of the two sets of towels. Out of the 16 panellists, 16 of panellists selected the towels treated with the laundry detergent that contained the encapsulated silicone as an active ingredient.

Example 4

An aqueous solution of poly(2-(dimethylamino)ethyl methacrylate) was prepared by using 3.03 gram of poly(2-(dimethylamino)ethyl methacrylate) and 10.26 gram of demineralised water and 3 gram of 37 percent hydrochloric acid. About 105 grams of a commercial cationic emulsion which contains 31% by weight of a polydimethyl siloxane having aminoethyl aminopropyl substituents and having a viscosity of about 2,500 mm$^2$/s and some acid, were added to the aqueous solution. 105 grams of the combined solution was poured onto 200 gram of soda ash under shear using a standard food mixer. The resulting granule was dried at 50° C. over a period of about 20 minutes in a fluid bed, and then sieved.

Example 5

A liquid detergent was prepared by blending 9.74 grams of Maranil® Pasta, 4.01 grams of Dehydol® LT7 and 41.25 grams of water.

An evaluation was carried out using a Miele® brand Model 934 front-loading washing machine. The washing conditions included a normal wash cycle at 40° C., a load of one kilogram (2.2 pounds) of four towels and five pillow cases, a spinning speed of 600 rpm, and machine-self addition of soft water. About 55 grams of the liquid detergent described above and 5 grams of soda ash were added to the machine. 46.30 gram of the granulated silicone prepared in Example 4 were added in the washing machine and then tested. As a comparison, towels were washed with 55 grams of the liquid detergent described above and 5 grams of soda ash. Both sets of towels were line dried overnight. 16 panellists were asked to assess the softness of the two sets of towels. All 16 panellists selected the towels treated with the encapsulated silicone as an active ingredient.

Example 6

All the raw materials used to make the granules reported in Example 4, were not granulated but instead they were directly added to the liquid detergent in the same proportion as found for Example 5. This blend was directly compared to the granule from Example 4. All 16 panellists selected the towels treated with the granulated silicone as being superior in softness.

Example 7

An aqueous solution of poly(2-(dimethylamino)ethyl methacrylate) was prepared by using 2.96 gram of poly(2-(dimethylamino)ethyl methacrylate), 3 gram of 37 percent hydrochloric acid and 10.16 gram of demineralised water. About 103 grams of a commercial silicone emulsion as used in Example 4 above, and 6.29 grams of Flosoft® 222 (commercial thickener from SNF) were added to the aqueous solution. 106.6 grams of the combined solution was poured onto 200 gram of soda ash under shear using a standard food mixer. The resulting granule was dried at 50° C. over a period of about 20 minutes in a fluid bed, and then sieved. This granule was compared to Example 4 granules which is the same composition but without thickener. Out of the 16 panellists, 13 of panellists selected the towels treated with the granulated silicone containing the thickener as being softer.

The invention claimed is:

1. A solid silicone-releasing composition comprising (a) a cationic polymer which is cationic at pH 7, is a homopolymer or a copolymer prepared from monoethylenically unsaturated monomers and has a higher water solubility at neutral pH than at a basic pH of 9-11, and (b) an active silicone ingredient whereby said cationic polymer and said active silicone ingredient are mixed with each other prior to or during the formation of said solid silicone-releasing composition;

wherein said active silicone ingredient comprises siloxane units of the general formula $R_bR'_cSiO_{4-b-c/2}$, where R is a hydrocarbon group; R' is a functional group selected from an amine containing substituent, an amido containing substituent and a polyoxyalkylene containing substituent wherein said active silicone ingredient is substituted with either amino or amido functionality and polyoxyalkylene functionality in the same polymer; b is an integer with a value of from 0 to 2; c is an integer with a value of 1, 2, or 3; and b+c has a value of from 1 to 3; or said active silicone ingredient comprises a polyorganosiloxane fluid and a hydrophobic particulate filler.

2. A solid silicone-releasing composition according to claim 1 wherein said cationic polymer comprises a homopolymer or copolymers prepared from monomers selected from the group consisting of dialkylaminoalkyl acrylates, dialkylaminoalkyl methacrylates, dialkylaminoalkyl acrylamides, dialkylaminoalkylalkyl acrylamides, dialkylaminoalkyl methacrylamides, dialkylaminoalkylalkyl methacrylamides, in which the alkyl groups are alkyl groups containing 1-4 carbon atoms, vinylpyridine, vinylimidazole; wherein the monomers are partially quaternised, fully quaternised, or salified by an acid, a quaternising agent, benzyl chloride, methyl chloride, an alkyl chloride, an aryl chlorides, or dimethylsulfate.

3. A solid silicone-releasing composition according to claim 2 wherein said cationic polymer is a linear polymer, a branched polymer, or a partially cross-linked polymer, wherein the branched or partially cross-linked polymer has branching groups comprising diethylenically unsaturated monomers.

4. A solid silicone-releasing composition according to claim 1 which also comprises a carrier selected from the group consisting of starches, zeolites, sulphates, carbonates, phosphates, polyphosphates, silicas, silicates, clays, cellulosic materials, citric acid, aluminosilicates, and detergent powders.

5. A solid silicone-releasing composition according to claim 1 which also comprises a thickener material which, when put into contact with an aqueous medium, increases the viscosity of said aqueous medium and comprises one or more polymeric materials selected from polyacrylates, derivatives thereof, polysaccharides, derivatives thereof and polymeric gums.

6. A solid silicone-releasing composition according to claim 1, comprising 0.3-10 percent by weight of said cationic polymer, 5-40 percent by weight of an aqueous medium, 1-40 percent by weight of said active silicone ingredient, 0 to 4 percent by weight of a thickener and 0 to 90 percent by weight of a carrier.

7. A solid silicone-releasing composition according to claim 1 which comprises one or more additional active ingredients selected from the group consisting of (i) organic and inorganic softening agents; (ii) organic fabric whitening and optical brightening agents; (iii) soil and stain repellency agents; (iv) dye fixatives; (v) anti-wrinkle treating agents; (vi) perfumes; (vii) detergency builders; (viii) disintergrants; (ix) bleaches; (x) enzymes; and (xi) surfactants and (xii) perfumes.

8. A granular encapsulated composition comprising a solid silicone-release composition according claim 1.

9. A laundry detergent powder, laundry detergent tablet or laundry detergent soap bar comprising as one of its ingredients a solid silicone-releasing composition according to claim 1.

10. A laundry detergent powder according to claim 9, which comprises as one of the ingredients a granular encapsulated composition comprising said solid silicone-releasing composition.

11. A method of treating garments in a washing process comprising adding to the washing said granular encapsulated composition according to claim 8.

12. A method of treating garments in a washing process-comprising adding to the washing said laundry detergent powder, said laundry detergent tablet or said laundry detergent soap bar according to claim 9.

* * * * *